United States Patent [19]

Herman

[11] Patent Number: 4,976,226
[45] Date of Patent: Dec. 11, 1990

[54] METHOD FOR INCREASING THE HEAT EFFICIENCY OF A PISTON COMBUSTION ENGINE

[75] Inventor: Zdenek Herman, Praskolesy, Czechoslovakia

[73] Assignee: CKD Praha, Kombinat, Czechoslovakia

[21] Appl. No.: 378,139

[22] Filed: Jul. 11, 1989

[51] Int. Cl.$^5$ ............................................. F02B 75/02
[52] U.S. Cl. .................................... 123/64; 123/25 C
[58] Field of Search ............... 123/25 P, 198 A, 25 C, 123/64

[56] References Cited

U.S. PATENT DOCUMENTS

| | | | |
|---|---|---|---|
| 1,794,799 | 3/1931 | Schwarz | 123/25 P |
| 3,964,263 | 6/1976 | Tibbs | 123/64 |
| 4,402,182 | 9/1983 | Miller | 123/25 P |
| 4,552,106 | 11/1985 | Spence | 123/25 P |
| 4,736,715 | 4/1988 | Larsen | 123/64 |

Primary Examiner—E. Rollins Cross
Attorney, Agent, or Firm—Ostrolenk, Faber, Gerb & Soffen

[57] ABSTRACT

The heat efficiency of a piston combustion engine is increased by addition of a steam-gas cycle to the working cycle of the combustion engine. After the working cycle of the engine is finished the combustion products of the engine are again compressed in the cylinder, and water is injected into the cylinder near the end of the working stroke and at the start of the following additional compression stroke. This cools down the combustion products and causes transmission of heat accumulated in the walls of the engine to the mixture of combustion products and water mist, which mixture is expanding in the following expansion stroke.

4 Claims, No Drawings

METHOD FOR INCREASING THE HEAT EFFICIENCY OF A PISTON COMBUSTION ENGINE

BACKGROUND OF THE INVENTION

The invention relates to a method for increasing the heat efficiency of a piston combustion engine by utilizing the heat generated in the course of the combustion process in an additional steam-gas cycle performed after the normal working cycle of the engine. Is is currently known that a substantial amount of heat generated in the course of the combustion process is dissipated together with exhaust gases and with the cooling water into the surrounding space without being transformed to mechanical energy.

The heat efficiency of piston combustion engines has been already tried to increase by different methods. One of said methods is described in the U.S. Pat. No. 1,794,799 of A. Schwartz, where a two-stroke cycle has been added to the existing two or four stroke working cycle of the engine, wherein water is injected into the cylinder during the second additional firing or power stroke. Due to an intensive cooling down of hot compressed combustion products a quick pressure reduction is experienced at the beginning of the following expansion stroke, so that the energy gained by this additional cycle mostly surpasses the energy required for additional compression.

Another known attempt of this kind has been described by Bruce Grover in Mechanical Engineering of December 1973, where again a couple of strokes have been added to the working cycle of the combustion engine and in the course of the additional fifth stroke water is injected into the cylinder, in a way similar to that of Schwartz. The amount of injected water is controlled by a thermostat.

Other methods for transformation of waste heat at combustion engines to mechanical energy have been also proposed, using complicated arrangements demanding on material and manufacturing costs and operating with substantial losses of energy. There is however no known method where the waste heat could be efficiently transformed directly to mechanical energy on the engine shaft without complicated additional means.

DESCRIPTION OF PREFERRED METHOD

It is an object of this invention to provide a method for increasing the heat efficiency of a piston combustion engine by direct and efficient transformation of waste heat to mechanical energy on the engine shaft.

According to this invention this task is accomplished by addition of a couple of steam-gas strokes to the working cycle of a piston combustion engine, where after the expanding stroke of the engine all expanded combustion products are again compressed and expanded in the following expanding stroke, and wherein water is injected into the cylinder near the end of the expansion stroke of the working cycle and in a part of the following added compression stroke. As a result, heat accumulated in the walls of the combustion engine in the course of the preceding working cycle is transmitted to the cooled and compressed combustion products and the preheated water mist and the compressed exhaust gases together with steam from the injected water are again expanding.

The additional steam-gas circulation transforms the heat of exhaust gases and the heat due to cooling to mechanical energy without a complicated additional arrangement with a substantially higher efficiency than known methods. The external cooling of the engine can be eliminated so that the design of the engine is simplified.

A combustion engine adapted for the method according to this invention may be an engine with a normal four stroke working cycle which is provided with an additional two-stroke cycle and a water injection valve is arranged at the cylinder head so that the water injected into the working space of the cylinder does not strike the walls of the combustion space. The distribution of valves and of the ignition is arranged instead of for a four stroke working cycle for a six stroke cycle so that the exhaust valve is opened only at the end of the fifth stroke and the suction valve at the end of the sixth stroke.

In case of an engine with a two-stroke working cycle the exhaust and scavenging channel is opened only at the end of the fourth stroke. The bottom of the piston and the walls of the combustion space are heat insulated.

The method for utilizing waste heat by an additional steam-gas circulation according to this invention operates as follows:

After the normal working stroke of the engine all expanded combustion gases and thus also all of the heat not used in course of the expansion remains in the working cylinder and the exhaust valve remains closed. In the course of the following stroke the combustion gases are again compressed, whereby they are cooled by water injected into the cylinder. The injection of water starts at or near the lower dead center of the piston and lasts for a part of the following additional compression stroke. The injected water withdraws heat from hot compressed combustion products, whereby the tiny water drops are preheated. This part of compression proceeds isothermic. After finished injection of water the heat difference between the injected water and the compressed combustion products is quickly eliminated, whereby the isothermic compression is changed to an adiabatic compression. At the upper dead center of the piston the mixture of cooled combustion products and of preheated water mist is pressed into the combustion space where it is subject to intensive circulation. Heat accumulated in the walls of the combustion space in the course of the preceding working cycle is transmitted to the mixture of cooled and compressed combustion products and of preheated water mist. In the following an isothermic expansion takes place, in the course of which heat is continuously transmitted from walls of the combustion space. Due to increase of heat and increase of the volume the preheated water is quickly changing to a dry overheated steam. An adiabatic expansion of the mixture of combustion products and of superheated steam follows. In the course of the additional expansion stroke part of the waste heat is transformed to mechanical energy. The expanded mixture of combustion products and of steam is discharged over the exhaust valve in the course of the expansion stroke.

In case of an engine with a two stroke cycle the expanded mixture is scavenged by the new filling. The individual thermodynamic operations of the described steam-gas cycle can be by different means adjusted so that the transformation of heat to mechanical energy proceeds in the most efficient manner.

The method for increase of the heat efficiency according to this invention can be utilized particularly for piston combustion engines of all sizes and applications. The additional steam-gas cycle increases the heat efficiency of these highly effective engines and simultaneously improves their operational properties. The complicated cooling system requiring a large space which consumes a part of the engine power can be eliminated. The engine is after starting quickly heated to its operational temperature. The temperature on the surface of the combustion engine remains substantially constant without regard to load and revolutions of the engine, so that the so called white smoke at idle running and low load is eliminated. The engine can use different fuels. The cooling of the engine will not depend to a great extent on the temperature of the surroundings. The heat stress of the exhaust valve is reduced. The noise of the engine is substantially reduced. As the upper temperature heat cycle of the combustion engine is high and the additional steam-gas cycle reduces the lower temperature of the cycle, whereby losses due to cooling are reduced, it can be supposed that the combustion engine provided with the cycle according to this invention will be a far more efficient arrangement for transformation of heat energy to mechanical energy.

What is claimed is:

1. Method for increasing the heat use efficiency of a piston combustion engine, comprising:

operating the engine through a working cycle comprising at least one stroke of contraction of the engine cylinder followed by one subsequent stroke of expansion of the engine cylinder, wherein heated combustion products are produced in the engine cylinder during the working cycle;

after the working cycle, operating the engine through a subsequent steam-gas cycle comprising: compressing the combustion products in the engine cylinder in a compression stroke and then expanding the engine cylinder in an expansion stroke injecting water into the cylinder toward the end of the final expansion stroke of the working cycle and during the subsequent compression stroke of the steam-gas cycle for transmitting heat that accumulated in the walls of the combustion space of the engine during the working cycle into the cooled and compressed combustion products and into the preheated water mist which are expanding together with steam created by the injection of water.

2. The method of claim 1, wherein the water is injected during the compression stroke near the start of the compression stroke of the steam-gas cycle.

3. The method of claim 1, wherein the working cycle is a four stroke cycle comprising two strokes of contraction each followed by a respective stroke of expansion.

4. The method of claim 1, wherein the working cycle is a two stroke cycle comprising a stroke of contraction followed by a stroke of expansion.

* * * * *